United States Patent
Greenspan et al.

(10) Patent No.: US 9,218,102 B1
(45) Date of Patent: Dec. 22, 2015

(54) REALTIME SYNCHRONIZED DOCUMENT EDITING BY MULTIPLE USERS

(71) Applicant: Google Inc., Mountain View, CA (US)

(72) Inventors: David Greenspan, Oakland, CA (US); Aaron Iba, San Francisco, CA (US); John Dalbert Zamfirescu-Pereira, Oakland, CA (US)

(73) Assignee: Google Inc., Mountain View, CA (US)

( * ) Notice: Subject to any disclaimer, the term of this patent is extended or adjusted under 35 U.S.C. 154(b) by 91 days.

(21) Appl. No.: 14/156,575

(22) Filed: Jan. 16, 2014

Related U.S. Application Data

(63) Continuation of application No. 12/431,627, filed on Apr. 28, 2009, now Pat. No. 8,656,290.

(60) Provisional application No. 61/143,374, filed on Jan. 8, 2009.

(51) Int. Cl.
  *G06Q 10/10* (2012.01)
  *G06F 3/0481* (2013.01)

(52) U.S. Cl.
  CPC .................................... *G06F 3/0481* (2013.01)

(58) Field of Classification Search
  CPC ....................................................... G06Q 10/10
  USPC ........................................................ 715/753
  See application file for complete search history.

(56) References Cited

U.S. PATENT DOCUMENTS

| | | | | | |
|---|---|---|---|---|---|
| 4,809,170 A | * | 2/1989 | Leblang | .................... | G06F 8/71 707/999.202 |
| 5,600,834 A | * | 2/1997 | Howard | .............. | G06F 11/1435 707/610 |
| 5,649,200 A | * | 7/1997 | Leblang | .................... | G06F 8/71 707/999.202 |
| 5,671,428 A | * | 9/1997 | Muranaga | .............. | G06Q 10/10 715/201 |
| 5,675,802 A | * | 10/1997 | Allen | ................ | G06F 17/30575 707/999.202 |
| 5,805,889 A | * | 9/1998 | Van De Vanter | .......... | G06F 8/71 707/E17.005 |
| 5,806,078 A | * | 9/1998 | Hug | .................... | G06F 17/2288 707/999.202 |
| 5,890,176 A | * | 3/1999 | Kish | ........................ | G06F 8/71 707/999.202 |

(Continued)

FOREIGN PATENT DOCUMENTS

| | | |
|---|---|---|
| CN | 1838111 | 9/2006 |
| WO | 2005112374 A1 | 11/2005 |

OTHER PUBLICATIONS

Agarwal, Copy Pictures from Flickr to Picasa Web Albums (or vice-versa), Jul. 30, 2007, 2 pgs.

(Continued)

*Primary Examiner* — Reza Nabi
(74) *Attorney, Agent, or Firm* — Ropes & Gray LLP

(57) ABSTRACT

Collaborative editing of electronic documents in realtime is provided. A host serves a client code over a network to a plurality of clients that each employ a browser to run the client code. The client code revises the text document locally in response to user input, frequently sends those edits to the host, receives updates from the other clients via the host, and revises the local text document accordingly. Each client, in some embodiments, stores three variables, one for edits not yet reported to the host, one for edits reported by not yet acknowledged, and one for the text document as modified by the acknowledged edits. Updates from the other clients are applied to the three variables according to certain rules. A composition of the three variables yields a version of the text document. The host keeps records of which edits were introduced by which client.

15 Claims, 5 Drawing Sheets

(56) References Cited

U.S. PATENT DOCUMENTS

| | | | |
|---|---|---|---|
| 5,940,082 A * | 8/1999 | Brinegar | G06Q 10/107 345/442 |
| 6,006,239 A * | 12/1999 | Bhansali | G06F 17/246 |
| 6,181,736 B1 | 1/2001 | McLaughlin et al. | |
| 6,212,548 B1 * | 4/2001 | DeSimone | H04L 12/1813 709/204 |
| 6,681,382 B1 * | 1/2004 | Kakumani | G06F 8/71 707/999.103 |
| 6,772,216 B1 * | 8/2004 | Ankireddipally | H04L 29/06 709/203 |
| 6,792,454 B2 * | 9/2004 | Nakano | G06F 17/3089 707/999.01 |
| 6,915,336 B1 | 7/2005 | Hankejh et al. | |
| 7,047,281 B1 | 5/2006 | Kausik | |
| 7,111,044 B2 | 9/2006 | Lee | |
| 7,188,140 B1 * | 3/2007 | Greenspan | H04L 51/046 707/999.001 |
| 7,222,138 B2 * | 5/2007 | Fomenko | G06F 8/71 |
| 7,222,156 B2 * | 5/2007 | Gupta | G06F 17/241 709/206 |
| 7,228,319 B1 * | 6/2007 | Fuchs | G06F 17/3023 |
| 7,233,951 B1 * | 6/2007 | Gainer | G06F 17/246 |
| 7,299,450 B2 * | 11/2007 | Livshits | G06F 8/71 717/121 |
| 7,440,623 B2 * | 10/2008 | Miura | G06F 17/30017 375/240 |
| 7,593,943 B2 * | 9/2009 | Clarke | G06Q 10/10 |
| 7,644,392 B2 * | 1/2010 | Geipel | G06F 8/71 717/121 |
| 7,756,391 B1 * | 7/2010 | Trottier | G06T 1/20 386/278 |
| 7,818,663 B2 * | 10/2010 | Khaba | G06F 17/2229 715/229 |
| 7,849,443 B2 * | 12/2010 | Clemm | G06F 8/71 717/121 |
| 7,899,883 B2 * | 3/2011 | Rasmussen | G06F 17/2288 709/217 |
| 7,941,399 B2 * | 5/2011 | Bailor | G06F 17/24 707/608 |
| 7,974,948 B2 * | 7/2011 | Baer | G06F 17/30011 707/638 |
| 8,028,229 B2 * | 9/2011 | Bailor | G06F 17/2288 715/255 |
| 8,087,000 B2 * | 12/2011 | Cartledge | G06F 8/71 717/121 |
| 8,656,290 B1 * | 2/2014 | Greenspan | G06F 17/2288 707/608 |
| 2004/0073581 A1 * | 4/2004 | McVoy | G06F 8/71 |
| 2004/0205653 A1 * | 10/2004 | Hadfield | G06Q 10/10 715/255 |
| 2004/0210823 A1 * | 10/2004 | Miura | G06F 17/30017 715/202 |
| 2004/0221323 A1 * | 11/2004 | Watt | H04N 7/15 725/135 |
| 2004/0260974 A1 * | 12/2004 | Livshits | G06F 8/71 714/19 |
| 2004/0267871 A1 * | 12/2004 | Pratley | G06Q 10/10 709/200 |
| 2005/0039116 A1 * | 2/2005 | Slack-Smith | G06F 17/24 715/255 |
| 2005/0044531 A1 * | 2/2005 | Chawla | G06F 8/71 717/122 |
| 2005/0076068 A1 * | 4/2005 | Fowler | G06F 21/6227 |
| 2005/0108402 A1 | 5/2005 | Colson et al. | |
| 2005/0166154 A1 | 7/2005 | Wilson et al. | |
| 2005/0234943 A1 * | 10/2005 | Clarke | H04L 67/38 |
| 2006/0178918 A1 * | 8/2006 | Mikurak | G06Q 10/06 705/7.25 |
| 2006/0235984 A1 * | 10/2006 | Kraus | G06F 17/24 709/228 |
| 2006/0277210 A1 | 12/2006 | Starbuck | |
| 2006/0282479 A1 * | 12/2006 | Johnson | G06F 8/65 |
| 2006/0288054 A1 * | 12/2006 | Johnson | G06F 8/61 |
| 2006/0288055 A1 * | 12/2006 | Johnson | G06F 8/71 |
| 2007/0050234 A1 * | 3/2007 | Corlett | G06F 17/50 |
| 2007/0061702 A1 * | 3/2007 | Letkeman | 705/7.29 G06F 8/71 715/210 |
| 2007/0130257 A1 | 6/2007 | Bedi et al. | |
| 2007/0198648 A1 | 8/2007 | Allen et al. | |
| 2007/0233811 A1 * | 10/2007 | Rochelle | G06F 17/246 709/219 |
| 2007/0250506 A1 * | 10/2007 | Stevens | G06Q 10/10 |
| 2007/0250531 A1 * | 10/2007 | Wiggins | G06F 17/30011 |
| 2007/0271340 A1 | 11/2007 | Goodman et al. | |
| 2008/0059539 A1 | 3/2008 | Chin et al. | |
| 2008/0104140 A1 * | 5/2008 | Vierich | G06F 8/71 |
| 2008/0178117 A1 | 7/2008 | Gelman et al. | |
| 2008/0208869 A1 * | 8/2008 | Van Riel | G06F 17/3089 |
| 2008/0208969 A1 * | 8/2008 | Van Riel | G06F 17/30861 709/204 |
| 2009/0055799 A1 * | 2/2009 | Cao | G06F 8/71 717/111 |
| 2009/0177744 A1 | 7/2009 | Marlow et al. | |
| 2009/0217196 A1 | 8/2009 | Neff et al. | |
| 2009/0228555 A1 | 9/2009 | Joviak et al. | |
| 2009/0271806 A1 * | 10/2009 | McDonald | G06F 9/543 719/329 |
| 2009/0313331 A1 * | 12/2009 | Rasmussen | G06F 17/2288 709/205 |
| 2010/0063961 A1 * | 3/2010 | Guiheneuf | G06F 17/30265 707/622 |
| 2010/0070882 A1 | 3/2010 | Wang et al. | |
| 2010/0083136 A1 * | 4/2010 | Komine | G06F 9/52 715/753 |
| 2010/0095198 A1 | 4/2010 | Bultrowicz et al. | |
| 2010/0169269 A1 * | 7/2010 | Chandrasekaran | G06F 17/30165 707/608 |
| 2010/0257457 A1 * | 10/2010 | De Goes | H04L 65/1093 715/751 |
| 2010/0306185 A1 * | 12/2010 | Smith | G06F 17/30581 707/709 |
| 2011/0161376 A1 * | 6/2011 | Dickson | G06F 17/2288 707/803 |
| 2012/0110445 A1 * | 5/2012 | Greenspan | G06F 17/24 715/256 |
| 2013/0212250 A1 | 8/2013 | Kleppner et al. | |
| 2013/0218845 A1 | 8/2013 | Kleppner et al. | |

OTHER PUBLICATIONS

Balasubramanyan, Cut Once: A Thunderbird Extension for Receipent Prediction and Leak Detection, Oct. 29, 2009, 5 pgs.

Carvalho, Cut Once: A Thunderbird Extension for Recipient Prediction and Leak Detection, Jan. 19, 2008, 3 pgs.

Carvalho, Ranking Users for Intelligent Message Addressing, ECIR '08 Proceedings of the IR Research, 30th European Conference on Advances in Informal Retrieval, Springer-Verlag Berlin, Heidelberg, 2008, 12 pgs.

Comer, Conversation-Based Mail, ACM Transactions on Computer Systems, vol. 4, No. 4, Nov. 1986, 21 pgs.

Dear, TERM-Talk: Plato's Instant Messaging, Dec. 19, 2002, 2 pgs.

Dodgeball.com, Mobile Social Software, Feb. 23, 2008, 2 pgs.

Flickr, Help/The Help Forum, Anyone can tell me how to copy all photos from Flickr another album gallery from the other website?, Feb. 23, 2008, 3 pgs.

Flock Browser—Share Pictures, Text and Video, User Guides, Feb. 22, 2008, 8 pgs.

Google Inc., International Search Report and Written Opinion, PCT/US2010/28269, Jan. 26, 2011, 8 pgs.

Google Inc., International Search Report and Written Opinion, PCT/US2010/028272, Aug. 30, 2011, 8 pgs.

Google Inc., International Search Report and Written Opinion, PCT/US2010/28277, Mar. 31, 2011, 8 pgs.

GROB, Cluestr: Mobile Social Networking for Enhanced Group Communication, GROUP '09, Sanibel Island, FL May 10-13, 2009, 10 pgs.

Hu, Microsoft wins . . . is typing a message IM patent, Oct. 8, 2003, 2 pgs.

Lavallee, Friends Swap Twitters, and Frustration, The Wall Street Journal, Mar. 16, 2007, 3 pgs.

(56) References Cited

OTHER PUBLICATIONS

Microsoft Office Online, Help and How-to, Move or Copy and Paste Contacts, Feb. 22, 2008, 2 pgs.
NetWin Advanced Server Software, Dbabble Instant Chat Server Overview, 2009, 3 pgs.
Nichols, High-Latency, Low-Bandwidth Windowing in the Jupiter Collaboration System, Proceedings of UIST '95, Pittsburg, PA, Nov. 15-17, 1995, 10 pgs.
Payne, API Documentation—Twitter Decelopment Talk, Jan. 18, 2008, 11 pgs.
Plasq, Hey Plasq! Scott has an idea, I Wish I Could Drag/Drop Directly Into a File, Aug. 29, 2007, 2 pgs.
Saviano, Annagram Concurrent Text Editor, Penn Engineering, 2006, 2 pgs.
TechHit.com, SimplyFile—Intelligent Filing Assistant for Microsoft Outlook, Jun. 4, 2008, 2 pgs.
Twitter / Sifow, About Name Sifow, Feb. 22, 2008, 3 pgs.
Twitter Support, Twitter FAQ, Feb. 22, 2008, 8 pgs.
Twitter / Get a Badge for Your Site, Display Twitters on Your Web Page, Feb. 22, 2008, 1 pg.
Webb, Twitter is a Conversation Ecosystem, Chris Webb on Publishing, Media, and Technology, Feb. 22, 2008, 8 pgs.
Webb, What's the Use in Twitter? Where is the Value?, Aug. 15, 2007, 5 pgs.
Yahoo! Messenger Search Help, How do I share photos during a conversation?, Feb. 22, 2008, 1 pg.
Cayenne-McCall, Synchronous 3D Document Collaboration, Nov. 2008, 41 pages.
Day-Richter, "What's different about the new Google Docs: Making Collaboration Fast", Sep. 23, 2010, 6 pages.
Google Inc., International Search Report and Written Opinion, PCT/US2011/058607, Feb. 21, 2012, 12 pages.
Herrick, Google This! Using Google Apps for Collaboration and Productivity, Oct. 11-14, 2009, pp. 55-63.
Macdonald, Advances in Information Retrieval, 30th European Conference on IR Research, ECIR 2008 Springer-Verlag Berlin, Heidelberg, Mar./Apr. 2008, 10 pages.
Shen, Flexible Merging for Asynchronous Collaborative Systems, Nov. 5, 2002, pp. 304-321. Retrieved from Internet at http://link.springer.com/chapter/10.1007/3-540-36124-3_18 on Aug. 10, 2015.
Wang, Google Wave Operational Transformation, Jul. 2010, 6 pages.
Westfechtel, "Structure-Oriented Merging of Revisions of Software Documents", ACM, 1991, pp. 68-79.

* cited by examiner

REALTIME SYNCHRONIZED DOCUMENT EDITING BY MULTIPLE USERS

CROSS-REFERENCE TO RELATED APPLICATIONS

This application is a continuation application of U.S. patent application Ser. No. 12/431,627, filed on Apr. 28, 2009 which claims the benefit, pursuant to 35 U.S.C. §119(e) of U.S. Provisional Patent Application Ser. No. 61/143,374 filed on Jan. 8, 2009 and entitled "Realtime Synchronized Document Editing by Multiple Users" both of which are hereby incorporated herein by reference.

BACKGROUND OF THE INVENTION

1. Field of the Invention

The invention relates generally to the field of collaborative editing and more particularly to computer-implemented systems and methods for realtime collaborative editing of various types of documents.

2. Description of the Prior Art

Collaborative text editors allow multiple individuals to collaboratively edit electronic documents.

SUMMARY

An exemplary system for collaborative editing of a text document comprises a plurality of client computing systems and a host computing system in communication with each of the plurality of client computing systems over a network. Each client computing system includes an input device, a display, and computer-readable memory. At least one of the plurality of client computing systems can include a printer, and at least one of the plurality of client computing systems can include a document scanner, in various embodiments.

The computer-readable memory of each client computing system stores a client code and a browser application configured to run the client code. The client code is configured to modify the text document according to edits from the input device, modify the text document according to edits made by another of the plurality of client computing systems, and render at least a portion of the text document to a window in the display. In some embodiments, the client code transmits the edits from the input device within 500 ms of receipt.

The host computing system is configured to serve the client code to each of the plurality of client computing systems. The host computing system includes a host code configured to receive an edit from a client code running on one of the plurality of client computing systems, and create a new version of the text document according to the received edit. The host computing system can also comprise a computer-readable memory to store the host code. In some embodiments, the host code is further configured to determine an update for the several client codes running on the other client computing systems, and to provide the update to the other client codes.

In some embodiments, an exemplary host computing system for collaborative editing of a text document comprises a server including first and second memories and a processor. The first memory stores computer readable instructions for a host code and the processor is configured to execute those computer readable instructions. The host code is configured to represent successive versions of a text document each as an ordered list of revision records stored in a second memory, where a revision record is a data structure that comprises a changeset and an authorship. The host code is further configured to receive a first changeset specifying an edit to a first version of the text document and define a second changeset based on the first changeset, where the second changeset is defined to modify a second version of the text document. The host code is further configured to define a revision record including the second changeset and the authorship of the first changeset, and add the revision record to the list.

In some embodiments of the host computing system each revision record further comprises a revision number. Each changeset can specify at least one addition or deletion of a character from a version of the text document, in some embodiments. The host code is optionally further configured to send an acknowledgement in response to receiving the first changeset.

In some embodiments, an exemplary client computing system comprises an input device, a display, first and second memories, and a processor. The first memory stores computer readable instructions for a browser application and computer readable instructions for a client code, where the computer readable instructions for the browser application are configured to run the computer readable instructions for the client code. The processor is configured to execute the computer readable instructions stored in the first memory.

The client code in the exemplary embodiment is configured to store in a second memory three changesets, the composition of which specifies a version of the text document, render a window to the display including at least a portion of the version of the text document, receive an edit to the version of the text document from the input device, define a changeset including the edit, and send the changeset to a host computing system. In some embodiments, the client code is further configured to send the changeset to the host computing system within about 500 ms from the time the edit was received. In various embodiments, the client code is further configured to assign the changeset to one of the three stored changesets when the changeset is sent to the host computing system, and in some of these embodiments the client code is further configured to receive an acknowledgement from the host computing system after sending the changeset. In some of the latter embodiments, the client code is further configured to compose a second of the three stored changesets with the one of the three stored changesets, and then assign an identity value to the one of the three stored changesets.

Methods for collaborative text editing in realtime are also provided herein. An exemplary method that would be performed by a host computing system, for example, comprises receiving a first changeset specifying an edit to a first version of a text document, and defining a second changeset based on the first changeset, where the second changeset is defined to modify a second version of the text document. The method further comprises defining a revision record including the second changeset and the authorship of the first changeset, adding the revision record to an ordered list of revision records, and serving the second changeset to a client computing system. The method can further comprise, in some instances, sending an acknowledgement in response to receiving the first changeset. In some embodiments, the second version of the text document is the latest version of the text document. Also in some embodiments, the second changeset is a follows changeset derived from the first changeset. The authorship of the first changeset, in some embodiments, comprises a unique ID for a client computing system.

Another exemplary method is performed by a client computing system, for example. The exemplary method comprises receiving an edit from an input device, updating a first changeset to include the edit, and sending the first changeset including the edit to a host computing system. The exemplary method further comprises assigning the first changeset including the edit to a second changeset and then assigning the identity to the first changeset, and receiving an acknowledgement from the host computing system. After receiving the acknowledgement, the method comprises assigning the composition of a third changeset with the second changeset to the third changeset, and then assigning the identity to the second changeset. In some embodiments, the method further comprises, before receiving the edit from the input device, assigning the identity to the first and second changesets and assigning a version of a text document to the third changeset.

This exemplary method can further comprise receiving a fourth changset from the host computing system, computing the composition of the third changeset with the fourth changeset, and assigning the composition to the third changeset. In some of these embodiments the method further comprises computing the follows changeset for the second changeset with the fourth changeset and assigning the follows changeset to the second changeset. In some of these latter embodiments, the method comprises further still computing a fifth changeset as the follows changeset for the fourth changeset with the second changeset, computing a sixth changeset as the follows changeset of the first changeset with the fifth changeset, and assigning the sixth changeset to the first changeset.

DETAILED DESCRIPTION OF THE INVENTION

The present invention is directed to systems that permit collaborative editing of documents, such as text documents, and computer-implemented methods for collaboratively editing text documents. Exemplary systems comprise a host computing system, such as a server, in communication over a network with each of a plurality of client computing systems. Together, the host and client computing systems run a collaborative text editing web-based application, sometimes referred to as a web application, comprising a host code that is executed by the host computing system and a client code executed by a browser application running on each client computing system. The collaborative text editing web application can be used to edit documents other than text documents, for example, graphics documents, spreadsheets, and the like, and text documents are discussed herein merely as an example. Similarly, though the illustrated methods pertain to text documents, the same methods can be applied to collaborative editing of other types of documents.

Each of the client codes and the host code maintains the text document in parallel on their respective computing systems. A client code of a first client computing system receives edits to the text document specified by a user, such as insertions or deletions of characters, modifies its locally maintained text document accordingly, and transmits the edits to the host code of the host computing system. The host code creates a new version of the text document according to the received edits, determines a suitable update for the several client codes running on the other client computing systems, and then provides the update to the other client codes. The other client codes use the update to incorporate the edits from the first client computing system into their locally maintained copies of the text document. Sending edits with sufficient frequency to the host computing system, and rapidly sending the updates to the other client computing systems, allows each user to see the edits of the other users in realtime.

Figure 1:
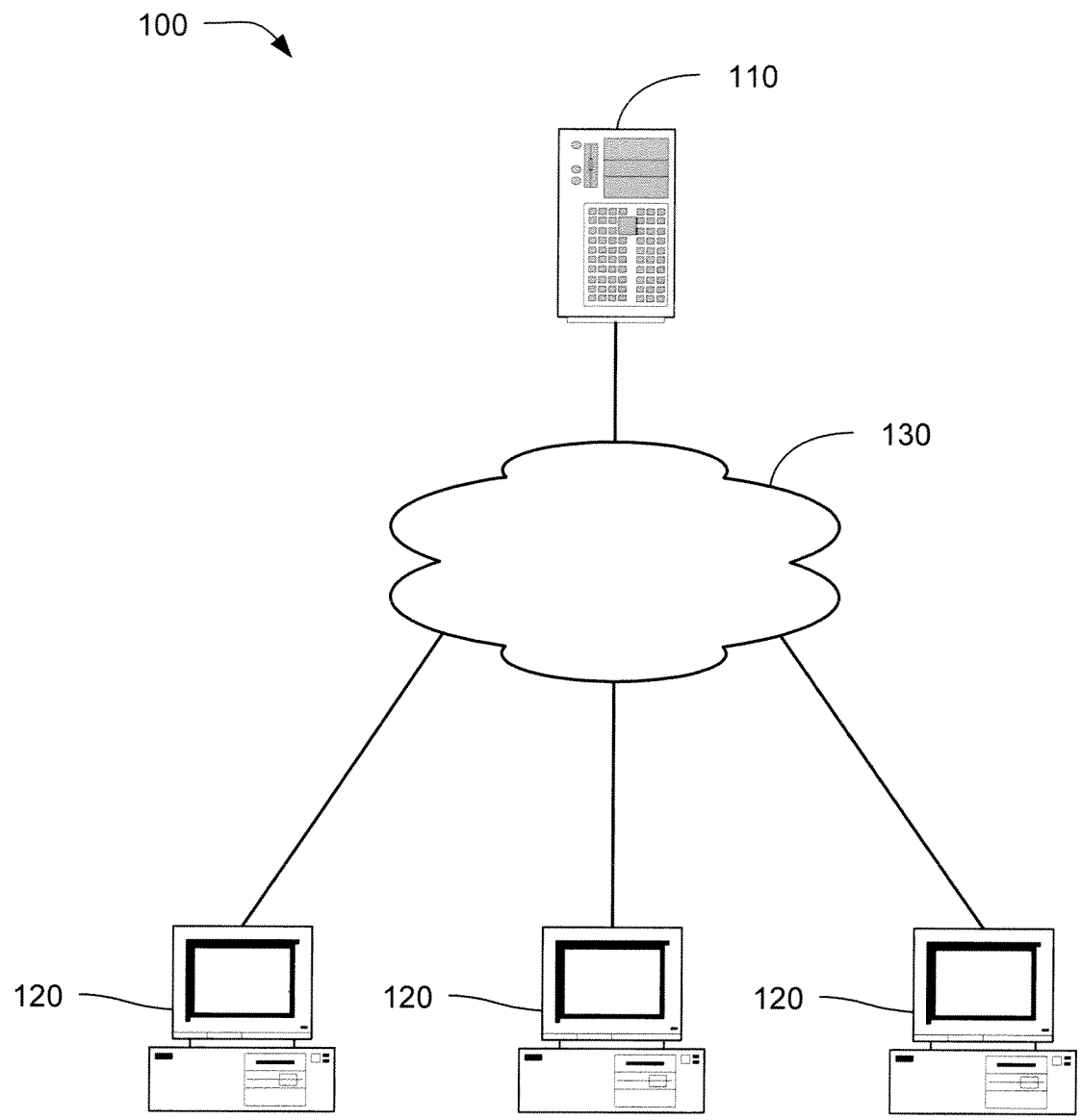
FIG. 1 schematically illustrates a system for implementing realtime collaborative text editing according to an exemplary embodiment of the invention.

FIG. 1 shows an exemplary system 100 for performing realtime collaborative text editing. The system 100 comprises a host computing system 110 in communication with a plurality of client computing systems 120 over a network 130 such as the Internet or another wide area network. The host computing system 110 can comprise one or more servers, data storage devices, workstations, and the like, networked together and configured to perform the functions described herein. The host computing system 110 and the client computing systems 120 define a host-client architecture in which clients communicate with each other through the host.

The host computing system 110 is configured to serve a client code of a collaborative text editing web application to each of the client computing systems 120. Here, the client code comprises browser javascript code, for example. The host computing system 110 also executes a host code of the collaborative text editing web application. In various embodiments, the host code comprises object code. The several client codes running on the client computing systems 120 together with the host code permit multiple users to simultaneously edit the same text document so that each user sees the changes made by the other users in realtime.

Each client computing system 120 comprises a computer, workstation, Personal Digital Assistant (PDA), mobile or smart phone, or other electronic device including a processor, a display, and one or more input devices such as a mouse, a keyboard, and a document scanner, for example. Client computing systems 120 also comprise, or are connected to, volatile and/or non-volatile computer-readable memory for storing the computer-readable instructions of the browser application and client code, as well as for storing data such as variable values. Client computing systems 120 can optionally comprise, or be connected to, one or more output devices such as a printer.

Each client computing system 120 runs a browser application that accesses the client code from the host computing system 110 and runs the client code. Each client code, when running on a client computing system 120, is configured to receive a version of the text document from the host computing system 110, receive user input specifying edits to the text document from the one or more input devices, modify the text document according to the edits, and display the text document in a browser window. Each client code is further configured to communicate the edits to the host code running on the host computing system 110, receive edits made by other users from the host code, and modify the text document according to those further edits. In some embodiments, the client code is configured to transmit the edits received from the input device within 500 ms of their receipt.

The host code is configured to maintain a record of successive versions of a text document. The host code is also configured receive an edit from a client code running on one of the plurality of client computing systems 120. The host code is further configured to create a new version of the text document according to the received edit. Exemplary methods for representing a version of a text document and for creating a new version of the text document are described in greater detail below. The host code is further configured to determine a suitable update for the several client codes running on the other client computing systems, and to then provide the update to those other client codes.

To better appreciate the methods performed by the host code running on the host computing system 110, and the client codes running on the client computing systems 120, and the interplay between the codes, the following discussion is provided. A text document is an electronic representation of an ordered arrangement of characters stored in a computer-readable medium such as Random Access Memory (RAM). Each text document is stored in association with a revision number. Each of the host computing system 110 and the several client computing systems 120 can store the same version of a text document or can store different versions of the text document. Text documents can be representations of tangible documents that have been scanned or otherwise digitized, and text documents can be rendered tangible by printing, for example.

A client code can direct the client computing system 120 to render a stored version of a text document to a window on the display. A text document rendered to the display can be rendered in a variety of ways and formats, including a "flowed" format, in which paragraphs are wrapped against the edges of the window. The client code can optionally direct the client computing system 120 to print the version of the text document on a tangible medium, such as paper.

Figure 2:
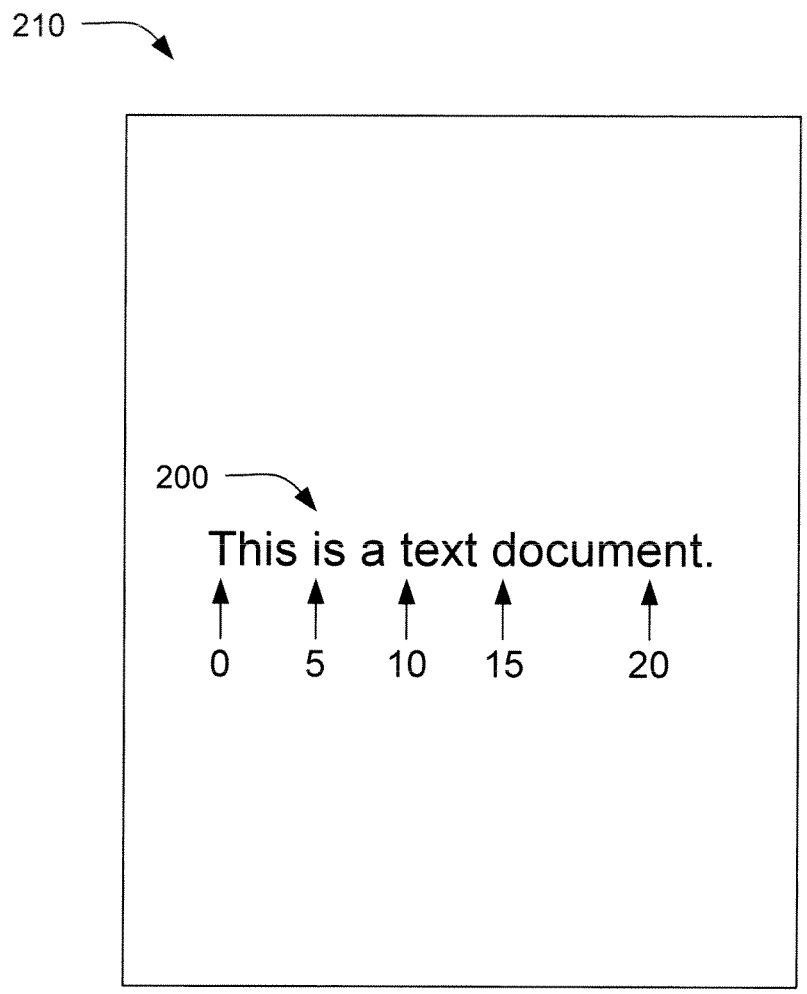
FIG. 2 illustrates a text document comprising characters, each having an index, according to an exemplary embodiment of the invention.

FIG. 2 graphically illustrates a text document 200 as displayed within a window 210 of a display. FIG. 2 can also be seen as representing the text document 200 as printed on paper. As indicated by FIG. 2, characters include letters, numbers, symbols, spaces, and punctuation marks, for example. Each character of the text document 200 has an index starting, by convention, at a zero (0) index with the first character. The text document 200 also is characterized by a length which is defined as the total number of characters. Text document 200 has a length of 24.

A changeset represents a set of changes to a version of the text document. The changes can comprise additions and/or deletions of one or more characters to the version of the text document. When a changeset is applied to that version of the text document, a new version of the text document results. It will be appreciated, therefore, that any version of a text document can also be represented by an ordered series of changesets, where the first changeset applies to an initial version of the text document. The initial version of the text document can be a blank text document or a pre-existing text document in various instances.

In some embodiments, changesets are canonical, defined here to mean that a given representation in a memory corresponds to only one changeset. Thus, different representations in memory necessarily correspond to different changesets. Being canonical, changesets are therefore comparable. Changesets can also be compact, in some embodiments, meaning that if there is more than one way to represent the changeset in memory then the one that takes up the least number of bytes will be used.

There are many ways to represent a changeset. In some embodiments a changeset is represented by the following format:

(l-l')[c1; c2; c3; ... ]

where l is the length of a version of the text document 200 before the change is applied and l' is the length of the next version of the text document 200 subsequent to the change. The array [c1; c2; c3; ... ] indicates which characters from the prior version are retained, and which characters are being added to the new version. Retained characters are represented by their indices in the prior version of the text document 200 and deleted characters are omitted. New characters are represented as themselves. For instance, if a first version of a text document 200 is "charge" and the subsequent version is "changes" then the changeset would be (6→7)[0, 1, 2, n, 4, 5, s]

which can also be represented more compactly as (6→7)[0-2, n, 4, 5, s].

As another example, a changeset to represent the further modification from "changes" to "hangs" would be (7→5)[1-4, 6].

It will be appreciated that each changeset has its own set of indices, starting with zero, such that in the above example the characters at the indices 1-4 in the prior version of the text document map to indices 0-3 in the present changeset, and the character at the prior index 6 maps to the new index 4.

The following example illustrates how a text document can be represented as an ordered series of changesets. In this example, A represents a first changeset applied to an initial (first) blank version of the text document and B represents a second changeset applied to a second version of the text document.

A=(0→5)[H, e, l, l, o]

B=(5→11)[0-4, w, o, r, l, d]

The third version of this text document is "Hello world" and can be represented as AB. This is referred to herein as the composition of A and B, and changesets are closed under composition, meaning that the result of performing the composition of two changesets always yields another changeset. It will be apparent that the composition AB can be reduced to a single changeset, C, where C=(0→11)[H, e, l, l, o, w, o, r, l, d]. In shorthand AB=C. In the following, Q will be used to represent a version of a text document such that QA, QB, etc., represent versions of the text document as modified by the respective changesets A and B.

For realtime document editing, more than one changeset can be applied to the same version of the text document. For instance, two users employing two different client computing systems 120 each make a change to the same version of the text document, Q. The changesets, however, may not be composable, and even if the changesets are composable, the composition might not make sense. As an example, the text document that each user seeks to modify has a length, n, and the two received changesets are A=(n→$n_a$)[ ... $n_a$ characters], and B=($n_a$→$n_b$)[ ... $n_b$ characters]

where n $n_a$ $n_b$. If A is applied to the text document, QA, the result has a length $n_a$, and therefore B cannot be further applied to the composition since B requires an initial length of n. Likewise, A cannot be applied to the composition of B with the text document, QB, which would have a length $n_b$, since A also requires an initial length of n.

Merging is a process for computing a single changeset from two changesets both meant to apply to the same version of a text document. Merging seeks to preserve the intent of both changesets. The resulting changeset is designated the merge of A and B and is represented as m(A, B).

An exemplary implementation for merging changesets has the following rules designed to preserve the intents of the respective users. Firstly, m(A, B)=m(B, A). A character is retained in m(A, B) if and only if the character is retained in both A and B. Thus, if either changeset deletes a character the intent of the user to delete that character is preserved. The merge m(A, B) includes all characters that are inserted characters in either changeset. Here, the intent of each user to insert characters is preserved. The result is that if both changesets insert the same character at the same location in the text document, the character will appear twice in the subsequent version of the text document.

Additionally, the merge m(A, B) preserves consecutive characters from both changesets. Consecutive inserted characters in a changeset are referred to herein as a run. Thus, runs from different changesets are not comingled, again, preserving the intent of the users to keep runs together. In subsequent changeset examples, runs are placed within quotation marks to designate that the characters are maintained as a run. The merge m(A, B) also preserves the relationships between insertions from either changeset with the retained characters. Accordingly, an insertion of one or more characters between two retained characters in either changeset will remain between the same two retained characters in m(A, B), preserving each user's intent to insert characters at a particular location in the text document.

Where the same character or run is inserted between the same two retained characters in both changesets, the character or run is simply repeated, as noted above. However, where different characters or runs are inserted between the same two retained characters, the insertions from one changeset will necessarily precede the insertions from the other changeset. Here, there needs to be a rule to determine which character or run will precede the other, and although the rule can be arbitrary, the rule should be applied consistently. For example, the rule can specify that the order goes by the alphabetic order of the users. Thus, if one changeset is from a user identified as "bob25" and the other is from a user identified as "tinman," the insertion from bob25 will come first.

Another useful changeset to compute, in the instance where multiple users are editing the same text document, is the changeset that will update a modified version of the text document retained by a client computing system 120. For example, a first user modifies a version of text document Q and a changeset representing the change is A. On the display of the client computing system 120 the first user sees QA. Similarly, a second user modifies the same version of text document Q, a changeset representing the change is B, and on the display of the client computing system 120 the second user sees QB. Although the host code running on the host computing system 110 can compute m(A, B) to arrive at a next version of Q, the client computing systems 120 do not need m(A, B) but do need to know how to modify QA or QB in order to arrive at the next version of Q. Accordingly, a changeset designated as a "follows" is computed as illustrated below.

As described in greater detail below, one client computing system 120 sends a changset A and receives a changeset B while the second client computing system 120 sends B and receives A. In order that both client computing systems 120 are synchronized such that both continue to display the same text document, Q composed with m(A, B), then QAB'=QBA'=Qm(A, B)

where A' and B' are the follows changesets. In the following discussion A' can also be represented as f(B, A) and B' can be represented as f(A, B) and therefore Af(A, B)=Bf(B, A)=m(A, B)=m(B, A).

As was the case with merges, follows are computed through the application of rules, and there are many possible rule sets that can be employed. An exemplary set of rules for computing follows changesets includes three rules. For a follows f(A, B), the first rule is that insertions in A become retained characters in f(A, B). As a second rule, insertions in B are considered inserted characters in f(A, B). Lastly, characters that are retained in both A and B are retained in f(A, B).

As an example, a version of text document Q is "baseball." A first user changes "baseball" to "basil" by replacing "sebal" with "si" while a second user changes "baseball" to "below" by deleting "as," "ba," and replacing the final "l" with "ow." Accordingly, Q=(0→8)[b, a, s, e, b, a, l, l];
A=(8→5)[0, 1, "Si", 7];
B=(8→5)[0, e, 6, "ow"];
m(A, B)=(8→6)[0, e, "si", "ow"]=(8→6)[0, "esiow"];
B'=f(A, B)=(5→6)[0, e, 2, 3, "ow"]; and
A'=f(B, A)=(5→6)[0, 1, "si", 3, 4].

It can be seen that AB'=BA'=m(A, B)=(8→6)[0, "esiow"].

Returning to the operation of the client code running on the client computing system 120, in some embodiments the client code maintains three changesets, A, X, and Y as variables in memory where A represents a current version of the text document including those changesets sent to, and acknowledged by, the host code running on the host computing system 110; X represents any changes submitted to the host code that have not yet been acknowledged by the host code; and Y represents changes that have not yet submitted to the host code. The composition of A, X, and Y yields the local text document, Local Text Document=AXY.

The client code also maintains, in some embodiments, a window, W, which represents that portion of the local text document actually provided to the display of the client computing system 120 to be viewed by the user. Maintaining the window is not essential, as the local text document can always be determined from A, X, and Y and a portion of the local text document can then be selected and displayed, but maintaining the window provides greater efficiency when working with larger text documents.

In some embodiments, the client code running on a client computing system 120 is configured to perform five operations for keeping the local text document current in view of changes made by the user of the client computing system 120 and in view of the changes made at other client computing systems 120. A first operation is to connect to the host computing system 110 and establish the local text document. A second operation is to allow changes to be made locally to the local text document. A third operation is to send locally made changes to the host code. A fourth operation is to receive an acknowledgement of the changes from the host code and update A and X. A fifth operation is to receive, from the host computing system 110, a changeset from a client code running on another client computing system 120 and modify A, X, and Y accordingly.

In the first operation the client code connects to the host computing system 110 and establishes the local text document. The client code can connect to the host computing system 110, for example, by specifying the appropriate URL for the host computing system 110. Connecting to the host computing system 110 may further comprise providing a browser cookie to the host code where the browser cookie specifies a unique ID for the client computing system 120. If no such cookie exists, then connecting to the host computing system 110 alternatively further comprises assigning a unique ID to the client computing system 120 and storing the unique ID in a browser cookie.

Assigning the unique ID can be performed in a number of ways. For example, in different embodiments the client code or the host code generates the unique ID. An exemplary unique ID is a string generated from the IP address of the client computing system 120, the current timestamp number, and a random number, such as "18.4.234.1.9837459873.2345878927349." In other embodiments the client code or the host code selects the unique ID from a large number of pre-defined unique IDs.

As noted, the first operation also comprises establishing the local text document. Establishing the local text document can comprise setting initial values for A, X, and Y. For A, the client code receives from the host code the current version of the text document, referred to herein as HEADTEXT, while X and Y are set to the identity, such that $A=(0 \rightarrow N)[\text{<original text>}]$;
$X=(N \rightarrow N)[0, 1, 2, \ldots N-1]$; and
$Y=(N \rightarrow N)[0, 1, 2, \ldots N-1]$.

It can be seen that the identity (denoted hereafter as $I_N$), when composed with another changeset, does not modify the other changeset.

In some embodiments, the first operation further comprises establishing and displaying W. Where the length of A exceeds a maximum length for W, establishing W can comprise assigning the indices of A to W, starting at zero, until the maximum length is reached.

The second operation allows changes to be made locally to the local text document. Here, a user makes an edit, E, through an input device of the client computing device 120, and the client code updates Y by computing the composition of YE. Updating Y can also be represented as $Y \leftarrow YE$ where "←" means assignment, as in Y is a variable in memory holding the local unsubmitted changes and is assigned a new value YE. In those embodiments where W is employed, the second operation also comprises updating W:

$W \leftarrow WE$.

In other embodiments, the client code computes the composition of AXY with the updated Y and redisplays the result.

The third operation comprises sending locally made changes, Y, to the host code. The third operation includes three tasks. The first task of this operation is to communicate Y to the host code. Here, Y is sent to the host code together with the unique ID. The second task is to assign Y to X, $X \leftarrow Y$ and the third task is to reassign the identity to Y $Y \leftarrow I_N$.

In an exemplary embodiment, the client code performs the third operation every 500 ms. As used herein, 500 ms is the threshold of realtime editing. In some embodiments, the client code communicates Y to the host code more frequently than every 500 ms, for example, every 450 ms, every 400 ms, every 350 ms, every 300 ms, every 250 ms, every 200 ms, every 150 ms, every 100 ms, or every 50 ms. Less frequently than 500 ms, and the delays in synchronization start to become perceptible. In some embodiments, if 500 ms elapses without receiving an acknowledgement from the host code, this third operation does not repeat until after such acknowledgement is received. Also, in some instances, the third operation is not performed if Y is the identity, signifying that no edits have been made during the interval.

In the fourth operation the client code receives an acknowledgement from the host code and in response updates both A and X. To update A, the client code composes AX and assigns the composition to A $A \leftarrow AX$.

To update X, the client code assigns the identity to X $X \leftarrow I_N$

Since the identity is not assigned to X until after the acknowledgement is received and A has been updated, no edits are lost. It will be appreciated that even if there is a delay in communication with the host computing system 110 due to a slow connection, for example, the client code allows the user to continue editing the local copy of the text document.

The fifth operation is to receive a changeset, B, from a client code running on another client computing system 120 (e.g., via the host computing system 110) and to modify A, X, and Y accordingly. A, X, and Y are modified by assigning the following:

$A \leftarrow AB$;
$X \leftarrow f(B, X)$; and
$Y \leftarrow f(f(X, B), Y)$.

In some embodiments, W is also modified as part of the fifth operation. Here, a changeset, D, that can be applied to W is determined such that $W \leftarrow WD$ where, $D=f(Y, f(X, B))$.

The host code running on the host computing system 110 also performs a number of operations. For example, the host code maintains an ordered list of revision records, where a revision record is a data structure that comprises a changeset and authorship information. An exemplary revision is as follows:

{changeset, unique ID, revision number} where the unique ID identifies the client computing system 120 associated with the changeset and the revision number is assigned sequentially. By convention, the first revision number is zero, in some embodiments. Optionally, the host code also maintains the HEADTEXT and updates this variable with each successive revision record. In the alternative, the HEADTEXT can be computed as needed by composing in order the changesets embodied in the revision records.

As noted above with respect to the client codes, each client code connects to the host computing system 110 and establishes a local text document. On the other side, the host code accepts the connection, updates a list of connected client computing systems 120 with the unique ID for the connecting client computing system 120, sends the HEADTEXT to the client code of the connecting client computing system 120, and associates the revision number of the sent HEADTEXT with the unique ID. In some embodiments, the revision number is also sent with the HEADTEXT and maintained in parallel by the client code. The host code can also, in some embodiments, store additional information in association with each unique ID, such as a screen name of the user which can be obtained at the time that the client code connects to the host code.

When the host code receives a changeset, C, from a client computing system 120, the host code updates the other connected client computing systems 120 and stores a new revision record. In order to perform these tasks, the host code first associates C with the revision number, $r_c$, for the sending client code's latest revision. In some embodiments, the client code transmits the revision number with the changeset, while in other embodiments the host code keeps track of the revision number for each client computing system 120 as the revision number advances with each update. In still further embodiments the client code transmits the revision number and the host code also tracks the revision number, which should agree, for redundancy and error checking.

Next, the host code computes a follows changeset C' relative to the most current version of the text document held by the host code, where the most current revision number is designated $r_h$, where the subscript stands for HEADTEXT. The host code computes C' for revision $r_h$ by computing the follows $f(Qr_c+i, C)$ where $Qr_{c+i}$ designates the next sequential version of the text document, and then repeating for each successive version until the most current version is reached. The final follows, C', is then transmitted to each of the client codes except for the originating client code, optionally with the next revision number. The host code sends an acknowledgement to the originating client code. Lastly, the host code creates a new revision record from C', the new revision number, and the unique ID for the originating client code, and adds the new revision record to the revision record list.

Figure 3:
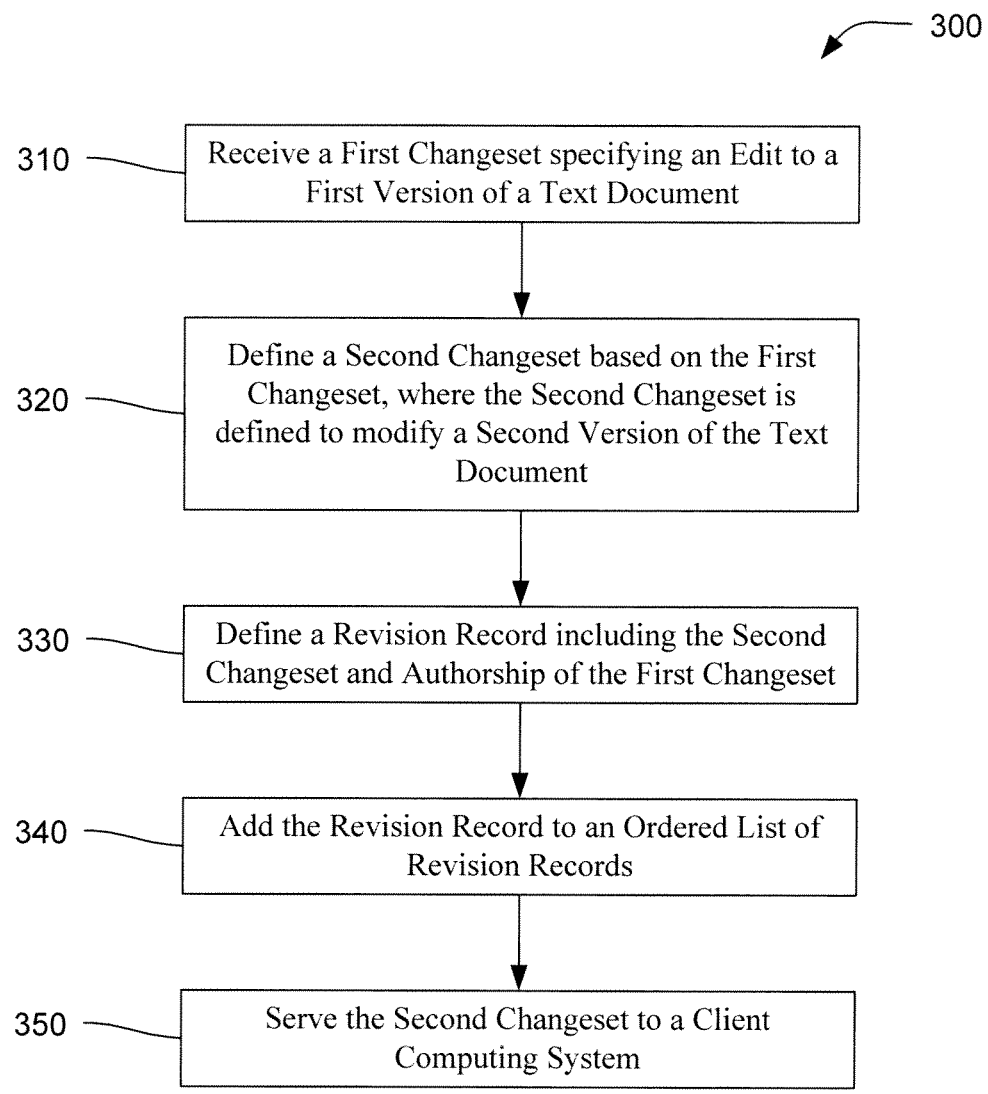
FIG. 3 is a flowchart representation of a method for revising a text document according to an exemplary embodiment of the invention.

FIG. 3 is a flowchart representation of an exemplary method 300 for collaboratively revising a text document according to an exemplary embodiment of the invention. The method 300 can be performed, for example, by a host computing system 110 such as a server. The method 300 comprises defining a new version of the text document in response to an edit, and updating one or more client computing systems to be consistent with the new version. Defining a new version of the text document comprises a step 310 of receiving a first changeset specifying an edit to a first version of a text document, a step 320 of defining a second changeset based on the first changeset, where the second changeset is defined to modify a second version of the text document, a step 330 of defining a revision record including the second changeset and the authorship of the first changeset, and a step 340 adding the revision record to an ordered list of revision records. Updating one or more client computing systems to be consistent with the new version comprises a step 350 of serving the second changeset to the one or more client computing systems.

The step 310 comprises receiving a first changeset specifying an edit to a first version of a text document. The first changeset can be received from a first client computing system 110, for instance. The edit can represent, for example, at least one insertion of a character and/or at least one deletion of a character from the first version of the text document. The first changeset, in some embodiments, specifies a change in a length of the first version of the text document due to the edit, specifies retained characters by their indices in the first version of the text document, and specifies an inserted character relative to the indices of the retained characters. In some embodiments, deletions of characters are denoted by the absence of their indices from the changeset. Optionally, the first changeset also specifies a revision number for the first version of the text document.

The step 320 comprises defining a second changeset based on the first changeset, where the second changeset is defined to modify a second version of the text document. Here, the second version of the text document is the latest version of the text document (also referred to herein as HEADTEXT). The second version will be a subsequent version to the first version of the text document, for example, when another changeset specifying an edit from a different client computing system 120 is received just before the first changeset is received in step 310. Accordingly, the second changeset specifies how to incorporate the edit specified in the first changeset into the latest version of the text document. The second changeset is based on the first changeset in that the second changeset is a follows changeset to incorporate edits of the first changeset.

The step 330 comprises defining a revision record including the second changeset and the authorship of the first changeset. The authorship of the first changeset can be a unique ID associated with the client computing system 120 from which the first changeset was received. The authorship, in some embodiments, is received with the first changeset. In other embodiments, the host computing system 120 can determine the authorship by keeping track of which TCP port is used for each connected client computing system 120 and by noting through which TCP port the changeset was received. Defining the revision record can also comprise, in some instances, including a revision number, where the revision number is assigned sequentially, in some embodiments.

The step 340 comprises adding the revision record to an ordered list of revision records. This step can comprise storing the revision record in a memory. The step 350 comprises serving the second changeset to the one or more client computing systems 120.

Figure 4:
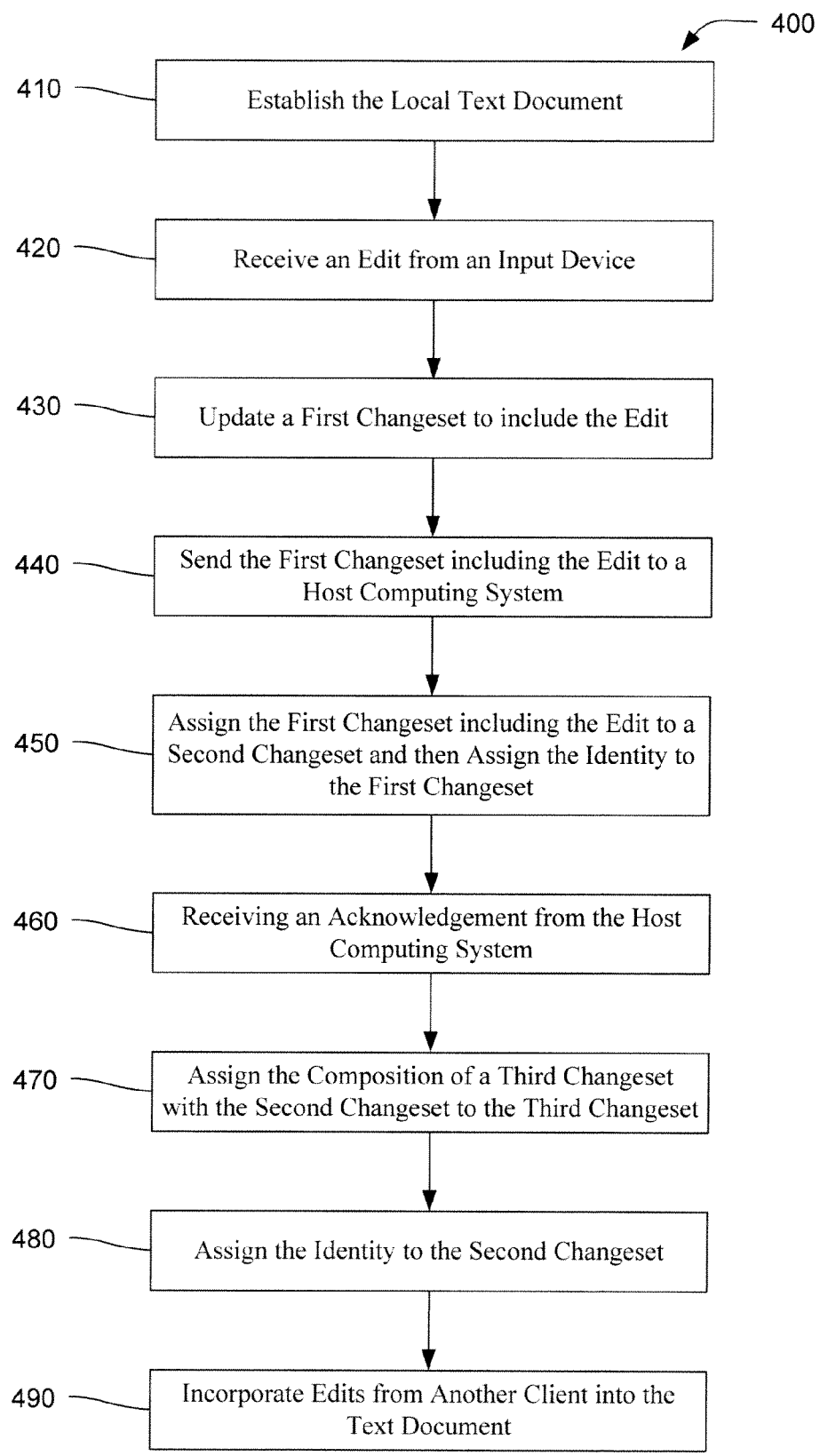
FIG. 4 is a flowchart representation of a method for revising a text document according to another exemplary embodiment of the invention.

FIG. 4 is a flowchart representation of an exemplary method 400 forcollaboratively revising a text document according to an exemplary embodiment of the invention. The method 400 can be performed, for example, by a client computing system 110 such as a computer. The method 400 comprises revising the text document with locally created edits and providing the edits to a host computing system 110. Revising the text document with locally created edits optionally comprises a step 410 of establishing the local text document. Revising the text document comprises a step 420 of receiving an edit from an input device, and a step 430 of updating a first changeset to include the edit. Providing the edits to the host computing system 110 comprises a step 440 of sending the first changeset including the edit to the host computing system 110, and a step 450 of assigning the first changeset including the edit to a second changeset and then assigning the identity to the first changeset. The method 400 also comprises a step 460 of receiving an acknowledgement from the host computing system 110, a step 470 after receiving the acknowledgement of assigning the composition of a third changeset with the second changeset to the third changeset, and a step 480 after assigning the composition to the third changeset of assigning the identity to the second changeset.

The method 400 optionally includes the step 410 of establishing the local text document which comprises assigning the identity to first and second changesets and assigning a version of a text document to a third changeset. Where the composition of three changesets A, X, and Y are used to represent the local text document, the identity is assigned to both X and Y, while a version of the text document, such as HEADTEXT, is assigned to A.

In the step 420 an edit is received from an input device such as a keyboard of the client computing system performing the method 400. The edit can represent, for example, at least one insertion of a character and/or at least one deletion of a character from a version of the text document. In the step 430 the first changeset is updated to include the edit. Here, for example, changeset Y is updated in step 430. Where the edit is represented as a changeset, E, updating Y comprises computing composition of YE and assigning the composition to Y.

In step 440 the first changeset including the edit is sent to the host computing system 110. In some embodiments, the first changeset including the edit is sent to the host computing system 110 with either or both of a version number and a unique ID. Sending the first changeset including the edit to the host computing system is performed, in some embodiments, within 500 ms from the time when the edit was received from the input device in step 420. Upon receipt, the host computing system 110 responds with an acknowledgement which is received from the host computing system 110 in step 460.

In step 450 the first changeset including the edit is assigned to a second changeset and then the identity is assigned to the first changeset. For example, Y is assigned to X and then the identity is assigned to Y. After the acknowledgement is received in step 460 from the host computing system 110, in step 470 a third changeset is composed with the second changeset and the composition is assigned to the third changeset. For instance, A composed with X is assigned to A. Step 480 is performed after assigning the composition to the third changeset and comprises assigning the identity to the second changeset. Thus, after A is composed with X is assigned to A, the identity is assigned to X.

In additional embodiments, the method 400 optionally comprises a step 490 of incorporating edits from another client into the text document. Step 490 is described in greater detail with respect to FIG. 5.

Figure 5:
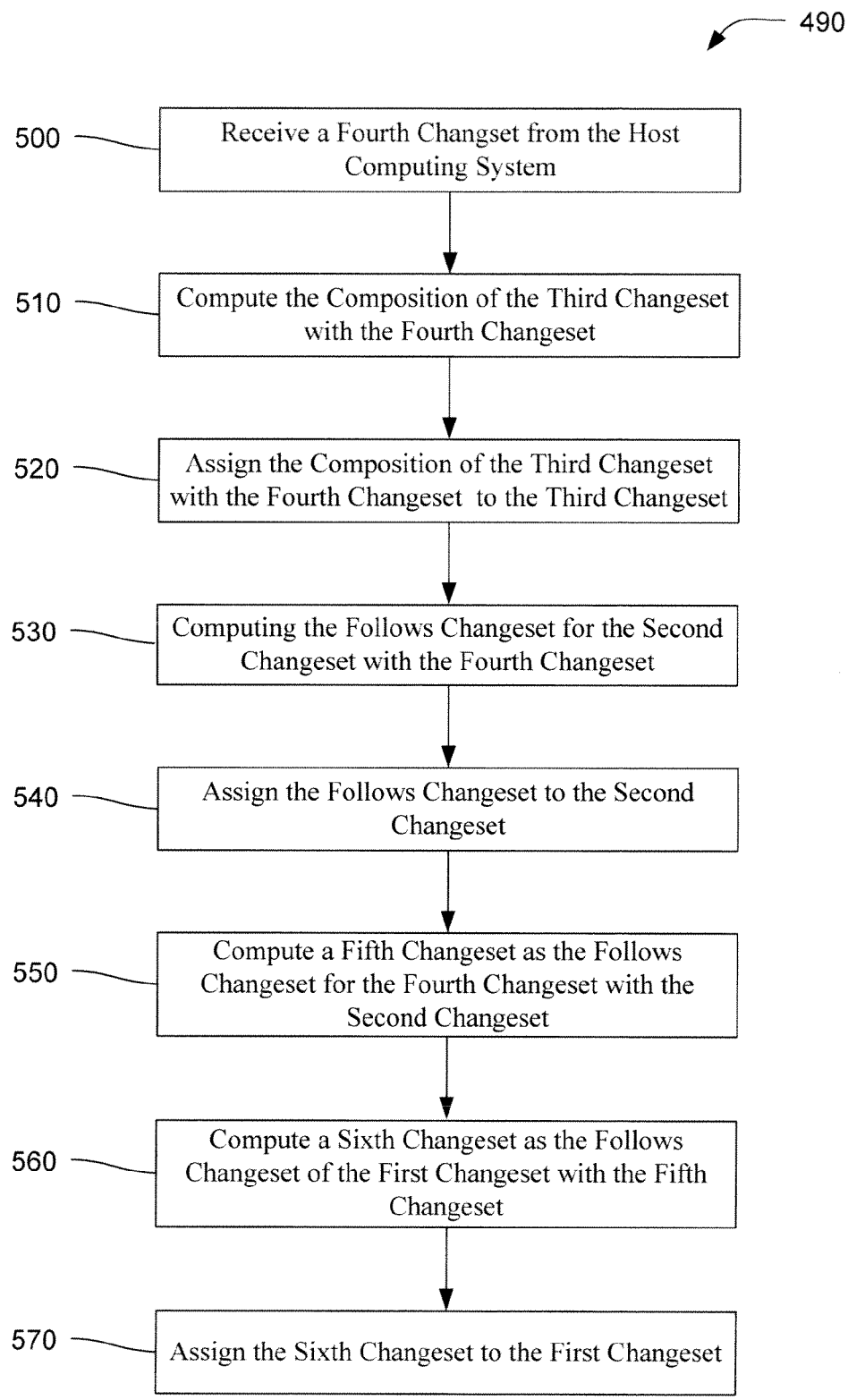
FIG. 5 is a flowchart representation of several sub-steps of a step illustrated in FIG. 4.

FIG. 5 illustrates that step 490 of method 400 comprises the steps for updating each of the three changesets A, X, and Y employed in steps 410-480. Thus, updating the third changeset, A, comprises a step 500 of receiving a fourth changset from the host computing system 110, such as changeset B, computing the composition of the third changeset with the fourth changeset (AB) in a step 510, and assigning the composition of the of the third changeset with the fourth changeset to the third changeset, A, in step 520.

Updating the second changeset, X, is performed by a step 530 of computing the follows changeset for the second changeset with the fourth changeset, f(B, X), and a step 540 of assigning the follows changeset to the second changeset, X. Updating the first changeset, Y, is performed by a step 550 of computing a fifth changeset as the follows changeset for the fourth changeset with the second changeset, f(X, B), a step 560 of computing a sixth changeset as the follows changeset of the first changeset with the fifth changeset, f(f(X, B), Y), and a step 570 of assigning the sixth changeset to the first changeset, Y.

Computing systems described herein can be configured to perform steps of the methods of the invention, for example, through the use of hardware, such as application-specific integrated circuits (ASICs), specifically designed to perform the particular functions of the method. Computer systems described herein can also be configured to perform steps of the methods of the invention, for example, through the use of firmware residing, for instance, in read only memory (ROM) or flash memory, where the firmware is programmed to perform the particular functions of the method. Computer systems described herein can also be configured to perform steps of the methods of the invention, for example, through the use of a processor capable of executing software residing in a memory, for example, in random access memory (RAM), where the computer instructions embodied in the software perform steps of the methods of the invention. Computer systems described herein can also comprise any combination of two or more of hardware, firmware, and software. Accordingly, the computing systems described herein execute computerized processes by following logic embodied in circuits or programming instructions, or both, to perform the specific methods described herein, and therefore these computing systems constitute specific machines. Also, as used herein, any statement concerning the host or the client code performing a function, such as the host code sending an acknowledgement, will be understood to be a shorthand expression for the computing system running the code to perform the function, whether by a processor executing software, or through specially configured hardware, or through specially programmed firmware.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method comprising:
storing a document as an ordered set of revision records;
receiving, from a first client, a representation of a first changeset specifying one or more changes relative to a first version of the document;
receiving, from a second client, a representation of a second changeset specifying one or more changes relative to the first version of the document;
identifying a revision record for the document, wherein the revision record corresponds to one or more changes that were made to the document prior to receiving the representation of the first changeset and the representation of the second changeset;
generating a third changeset based on a merge of the first changeset and the second changeset, and the revision record;
adding a new revision record that includes the third changeset to an end of the ordered set of revision records;
computing a first follows changeset from the first changeset and the second changeset;
computing a second follows changeset, different from the first follows changeset, from the first changeset and the second changeset;
transmitting the first follows changeset to the first client; and
transmitting the second follows changeset to the second client;
wherein a second version of the document is determined by applying the first and second follows changesets at the first and second clients respectively.

2. The method of claim 1, wherein the document is accessible to a plurality of client computer systems including the first client and the second client.

3. The method of claim 1, wherein each of a plurality of the revision records for the document includes a respective revision number.

4. The method of claim 1, wherein each of a plurality of the revision records for the document includes a respective changeset that specifies at least one addition or deletion of a character from a prior version of the document.

5. The method of claim 1, further comprising:
after receiving the representation of the first changeset, sending an acknowledgement to the first client indicating that the first changeset has been received.

6. An apparatus comprising:
a processor; and
a memory to store computer program instructions, the computer program instructions when executed on the processor cause the processor to perform operations comprising:
storing a document as an ordered set of revision records;
receiving, from a first client, a representation of a first changeset specifying one or more changes relative to a first version of the document;
receiving, from a second client, a representation of a second changeset specifying one or more changes relative to the first version of the document;
identifying a revision record for the document, wherein the revision record corresponds to one or more changes that were made to the document prior to receiving the representation of the first changeset and the representation of the second changeset;

generating a third changeset based on a merge of the first changeset and the second changeset, and the revision record;

adding a new revision record that includes the third changeset to an end of the ordered set of revision record;

computing a first follows changeset from the first changeset and the second changeset;

computing a second follows changeset, different from the first follows changeset, from the first changeset and the second changeset;

transmitting the first follows changeset to the first client; and transmitting the second follows changeset to the second client;

wherein a second version of the document is determined by applying the first and second follows changesets at the first and second clients respectively.

7. The apparatus of claim 6, wherein the document is accessible to a plurality of client computer systems including the first client and the second client.

8. The apparatus of claim 6, wherein each of a plurality of the revision records for the document includes a respective revision number.

9. The apparatus of claim 6, wherein each of a plurality of the revision records for the document includes a respective changeset that specifies at least one addition or deletion of a character from a prior version of the document.

10. The apparatus of claim 6, the operations further comprising:

after receiving the representation of the first changeset, sending an acknowledgement to the first client indicating that the first changeset has been received.

11. A non-transitory computer readable medium storing computer program instructions, which, when executed on a processor, cause the processor to perform operations comprising:

storing a document as an ordered set of revision records;

receiving, from a first client, a representation of a first changeset specifying one or more changes relative to a first version of the document;

receiving, from a second client, a representation of a second changeset specifying one or more changes relative to the first version of the document;

identifying a revision record for the document, wherein the revision record corresponds to one or more changes that were made to the document prior to receiving the representation of the first changeset and the representation of the second changeset;

generating a third changeset based on a merge of the first changeset and the second changeset, and the revision record;

adding a new revision record that includes the third changeset to an end of the ordered set of revision records;

computing a first follows changeset from the first changeset and the second changeset;

computing a second follows changeset, different from the first follows changeset, from the first changeset and the second changeset;

transmitting the first follows changeset to the first client; and transmitting the second follows changeset to the second client;

wherein a second version of the document is determined by applying the first and second follows changesets at the first and second clients respectively.

12. The non-transitory computer readable medium of claim 11, wherein the document is accessible to a plurality of client computer systems including the first client and the second client.

13. The non-transitory computer readable medium of claim 11, wherein each of a plurality of the revision records for the document includes a respective revision number.

14. The non-transitory computer readable medium of claim 11, wherein each of a plurality of the revision records for the document includes a respective changeset that specifies at least one addition or deletion of a character from a prior version of the document.

15. The non-transitory computer readable medium of claim 11, the operations further comprising:

after receiving the representation of the first changeset, sending an acknowledgement to the first client indicating that the first changeset has been received.

* * * * *